Jan. 5, 1954 E. H. SHUMAKER 2,665,145
QUICKLY DETACHABLE SWIVEL JOINT
Filed June 15, 1950
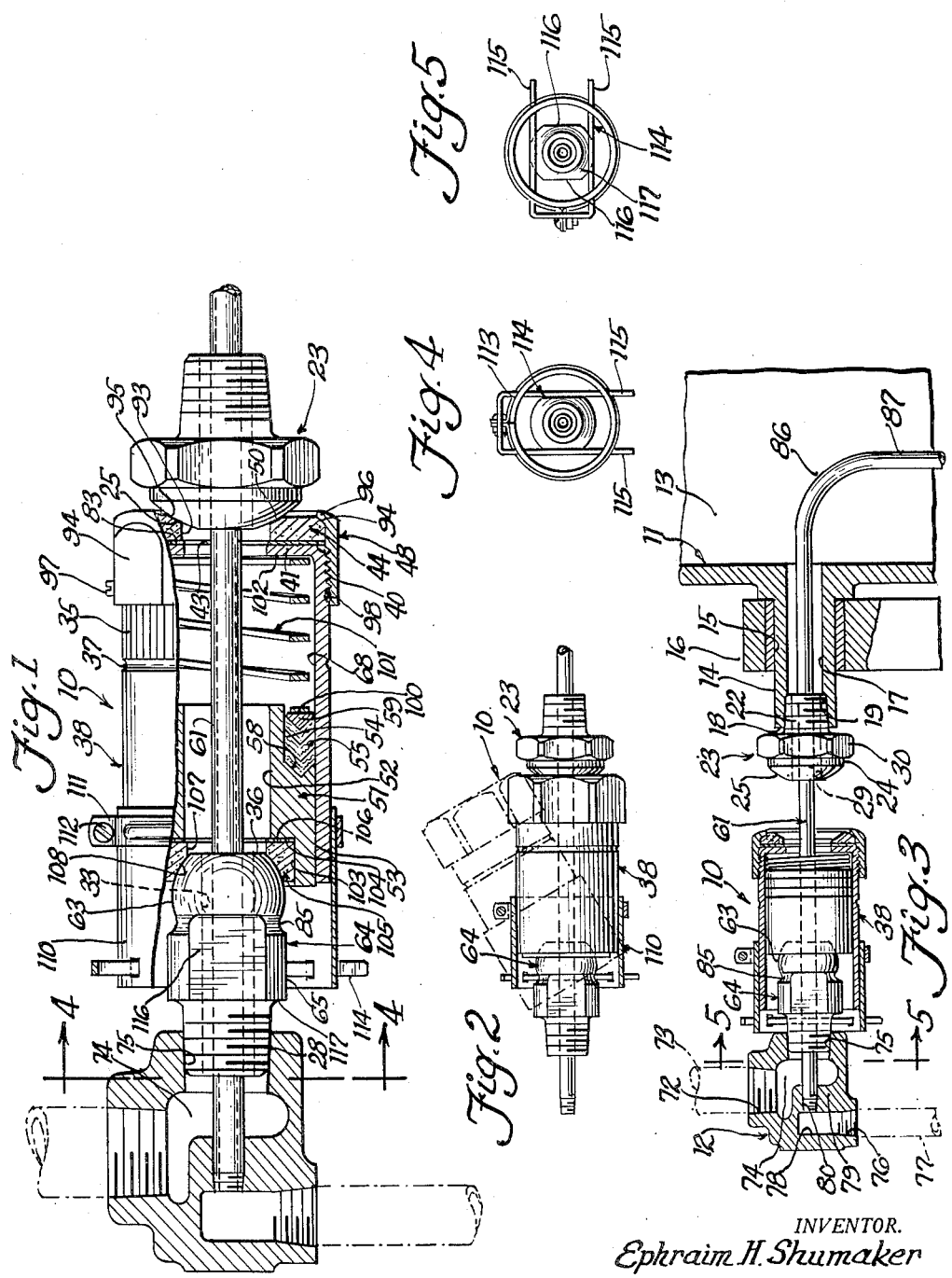
INVENTOR.
Ephraim H. Shumaker
BY
Robert H. Wendt
Att'y Patented Jan. 5, 1954

2,665,145

UNITED STATES PATENT OFFICE 2,665,145

QUICKLY DETACHABLE SWIVEL JOINT

Ephraim H. Shumaker, Sterling, Ill., assignor to Rotherm Engineering Company, Inc., Chicago, Ill., a corporation of Illinois Application June 15, 1950, Serial No. 168,186

8 Claims. (Cl. 285—11)

The present invention relates to quickly detachable swivel joint, and is particularly concerned with an improved unit construction which is adapted to be sold and installed as a unit cartridge without necessity for using any tools, the joint being removed and replaced without any loss of time.

The present application is a continuation-in-part of my prior application, Ser. No. 67,128, filed December 24, 1948.

In the industrial arts there are many instances in which rotating parts have to be supplied with liquid or steam; and this involves a rotating connection in the conduit leading from the boiler or other source of supply to the device in question. For example, a calendering roll may be heated with superheated steam, which is supplied by a conduit which leads through the trunnions of the calendering roll; and there may be other conduits passing through the trunnions which draw off, by suction or by siphon action, the condensed liquid.

In order to provide such a connection to a tubular conduit leading axially of the trunnion of a calendering roll, the end of the trunnion may terminate in a threaded portion which is provided with tapered threads, such as pipe threads.

When the rotating tubular joint is connected to this pipe threaded opening, it will usually be found that the fitting that goes in the pipe threaded opening is not axial; and such a fitting generally tends to wabble, and this wabbling is accentuated with the length of the fitting.

The reason for this is that the male pipe threads and the female pipe threads are not concentric to the axis of the trunnion. This comes about through the fact that pipe threads are cut with taps and dies, which taps and dies have a plurality of concentrically located teeth; but the teeth are of different sharpness, and the parts of the trunnion or pipe fitting may be of different hardness or softness on different sides. Therefore, a tap or a die tends to follow the path of least resistance, and its teeth cut in more deeply on the soft side and more shallowly on the hard side so that the resultant threads are not generally concentric and generally not axial.

Thus provision must be made in any tubular rotating joint for lack of concentricity and for a universal movement or wabbling action; and this wabbling action also causes a difference in length of the distance between the fixed pipe and the fitting which is carried by the trunnion.

One of the objects of the invention is the provision of an improved rotating liquid-tight tubular joint which permits all of these necessary movements, and which is also adapted to be removed from the machine in a very short time and replaced without removing any threaded parts, thus saving the hours and minutes of stoppage which are caused when the devices of the prior art have to be repaired or replaced, since they involve the disassembly of pipe threaded members.

Another object of the invention is the provision of an improved unit connecting member which is adapted to effect a rotating liquid-tight tubular joint between a fixed pipe and a rotating pipe, even when the latter is not concentrically or axially located with respect to the former or with respect to the axis of rotation.

Another object is the provision of a joint of the class described which may be repaired or replaced without disconnecting any pipes, and which itself tends to expand into liquid-tight engagement with the fittings that are carried by the rotating part and the fixed part so that it is only necessary to contract the unit to make it shorter and to remove it from the machine so that it may be replaced with a new unit and labor stoppage minimized.

Another object of the invention is the provision of a rotating tubular joint member of the class described in the form of a cartridge type unit having an expanding characteristic so that by virtue of its own structure it is held in liquid-tight engagement with the fittings that are provided on the fixed part and the rotating part.

Another object is the provision of an improved device of the class described which is adapted to stand up under high temperatures, which operates with a minimum loss of pressure, and which may be manufactured economically, which is sturdy, simple, and efficient, and which may be provided with means for removing the condensate from the inside of the member that is being supplied with steam.

Other objects and advantages of the invention will be apparent from the following description and the accompanying drawings, in which similar characters of reference indicate similar parts throughout the several views.

Referring to the single sheet of drawings accompanying this specification,

Fig. 1 is a fragmentary elevational view in partial section, showing a rotating tubular joint embodying the invention, in connection with fixed pipes leading to a source of supply for steam and also for siphoning off and discharging the water or condensate from a calender roll or the like which is used with the joint;

Fig. 2 is a side elevational view in partial section, showing the anchor shell moved to a new position so that it may be used for holding the joint in contracted position, as shown in Fig. 3;

Fig. 3 is a fragmentary sectional view similar to Fig. 1, but also disclosing parts of the calender roll and having the joint member anchored in contracted position as a preliminary to its removal from the installation;

Fig. 4 is a transverse sectional view, taken on the plane of the line 4—4 of Fig. 1, looking in the direction of the arrows;

Fig. 5 is a transverse sectional view, taken on the plane of line 5—5 of Fig. 3, looking in the direction of the arrows, and showing the parts as they look when the joint member is anchored in contracted position.

Referring to Fig. 1, 10 indicates in its entirety the tubular rotating joint unit which is shown in Fig. 3 in connection with a calender roll 11 and a pipe fitting 12 for the purpose of supplying the calender roll with steam and for withdrawing the condensate.

The calender roll 11 is a hollow cylindrical member and is provided with an axially extending trunnion 14 rotatably mounted in a bearing 15 carried by frame 16. The trunnion 14 has a through bore 17 leading to the interior chamber 13 of the calender roll and terminating at the outer end 18 of the trunnion with a threaded bore 19, which is tapped with pipe threads.

The pipe threads are preferably employed because with such threads a complementary fitting becomes tighter as it is threaded into the bore, eventually making a liquid-tight joint.

The pipe fitting 12 comprises a metal member which is fixedly mounted on a frame, and which has an upper threaded opening 72 for receiving a pipe 73 which supplies heated steam. The fitting has a chamber 74 leading to a laterally extending threaded outlet 75, which is in communication with the present joint unit.

The fitting 12 also has an internal wall 79 provided with a threaded bore 80 for receiving a condensate siphon pipe 61 comprising a tubular metal member which extends from the fitting 12 through the joint unit 10 and through the trunnion 14 to the interior chamber 13 of the calender roll, where it is bent downward at 86 and has the lower end of the vertical portion 87 dipping in the water, which condenses inside the calender roll.

The condensate pipe 61 is in communication with a chamber 78 which has a threaded discharge opening at 76 leading to a discharge pipe 77.

The present installation differs from my prior application in that the siphon tube 61 is threaded into the fitting 12 in this case, and must be removed when the tubular joint unit is to be removed.

The threaded bore 19 in the end of the trunnion 14 supports a rotor ball fitting 23, which has its threaded part 22 threaded into the bore 19. The rotor ball fitting 23 has a hexagonal portion 30 for reception of a wrench or the like; and it has a through bore 29 for conducting steam into the trunnion bore 17. The outer end of the rotor ball fitting 23 is partially spherical at 25 for the purpose of providing a universal joint connection with the joint unit 10. Between the spherical part 25 and the hexagonal part 30 there may be a short cylindrical portion 24.

The fixed pipe fitting 12 also supports a stationary ball fitting 64, which I prefer to call the flexer. The flexer 64 has a cylindrical body 65 and a tapered threaded end portion 28, which is threaded into the bore 75. At its inner end the flexer 64 has a partially circular groove 85 for providing a clearance to permit a greater pivotal movement with respect to the joint unit 10.

Beyond the groove 85 the flexer 64 has a partially spherical formation 63; and the flexer 64 has a through bore 33 communicating with the outlet chamber 74 in the pipe fitting 12.

The end 36 of the flexer 64 may be flat about the bore 33. The rotor ball fitting 23 is preferably made out of stainless steel hardened, while the flexer 64 is preferably made out of bronze.

The joint unit 10 comprises the removable part of the assembly; and it is provided with a cylindrical casing 38 comprising a bronze tube having a milled portion 35. The groove 37 between the milled portion 35 and the main body of the casing 38 is rendered necessary in the milling of the casing.

The tubular casing 38 is provided with threads 40 at its end for receiving an internally threaded cap 48, which may be made out of bronze, and which has a noncircular or hexagonal formation on its outside, as indicated at 94. The casing 38 has an inwardly extending annular end flange 41, the annular end surface 43 of which serves as a seat for a thin paper gasket 83.

The cap 48 has an open end provided with a cylindrical bore 95 and with an inwardly turned annular flange 96 for retaining a graphite carbon packing ring 44 for minimum friction. The graphite packing ring 4 is substantially rectangular in shape, having a central cylindrical bore 93; and it is beveled at 94 to fit inside the flange 96, which holds the packing ring against the end of the casing 38.

At its outer end the packing ring 44 has a partially spherical annular surface 50 for engagement with the spherical surface 25 on the rotor ball fitting 23. The two partially spherical surfaces 25 and 50 permit a universal movement between the casing 10 and the rotor ball fitting 23, while still maintaining a liquid-tight and gas-tight joint.

These surfaces also permit relative rotation between the unit 10 and rotor ball fitting 23.

The cap 94 is preferably provided with a set screw 97 for holding it in its final position, clamping the paper gasket 43 and the rotor seal 44 against the flange 41. The set screw 97 may be arranged so that it substantially registers with the partly circular groove 98 under the cap and at the right end of the knurled surface 35 (Fig. 1).

The casing 38 has a circular bore 68, which slidably receives the hollow piston 51, having a through bore 52. The piston is an elongated cylindrical member so that its outer cylindrical surface 53 may slide in the cylindrical bore 68 without binding; and the piston has a reduced cylindrical portion 54, forming an annular groove between this part and the wall of the bore 68 for receiving the V-shaped packing rings 55.

The base or left end of the groove has a V-shaped surface 58 conforming to the apex of the annular V-shaped packing, and preferably having such an angularity that it tends to expand the packing by engaging the apex of the packing. The packing is engaged at its right end (Fig. 1) by expander 59, comprising a V-shaped metal ring, the angularity of which is slightly more inside of the V of the packing, tending to spread the V-shaped packing by engaging adjacent its outer edges, rather than at the apex.

The expander ring 59 has a flat side 100, which is engaged by one end of a helical compression spring 101, preferably made of flat, stainless steel wire so as to permit it to collapse to a minimum size in an axial direction. The other end of the spring 101 is seated against the inner surface 102 of the flange 41 on the casing.

Thus the piston is urged toward the left, or outward with respect to the casing; and the packing is also urged into engagement with the cylinder walls. At its left end the piston 51 has its bore 53 communicating with an enlarged counterbore 103, which terminates in an annular shoulder 104.

The counterbore 103 is adapted to receive the universal sealing member 105, which is annular in shape and substantially rectangular in cross section, and which may also engage a paper sealing gasket 106 located against the annular seat 104. The sealing ring 105 is provided with a through bore 107, which may be substantially the same size as the bore 52 or slightly smaller; and at one end it is formed with a patrially spherical sealing surface 108, which is annular and conforms to the spherical surface 63 of the ball fitting 64.

I prefer to call the packing ring 105 the flex seal because the major part of the flexing movement takes place at this ball without relative rotation, as distinguished from the surface at 25, where there is relative rotation.

The partially spherical surfaces 108 and 63 are held in tight contact by means of the spring 101; and as the casing is larger in diameter than the projected area of the points of contact of the surfaces 108 and 63, the steam pressure inside the casing also tends to force the unit into liquid and gas-tight sealing engagement with both of the ball fittings.

The higher the pressure, the tighter is the engagement between the sealing surfaces; and this is a very important feature of the invention. The steam or other gas in the casing also acts on the piston packings, tending to expand them into tighter engagement with the internal wall of the cylinder.

The casing 38 is preferably provided with a cylindrical metal sleeve 110, which may be made of steel, and which serves as the anchor shell. The anchor shell 110 has a close sliding fit on the casing 38, but may be clamped in place by means of a hose clamp 111, having its flanges provided with the screw bolt and nut 112.

In some cases the right end of the anchor shell 110 may have one or more axial slits to separate it into separate clamping portions; but its fit may also be such that the sleeve 110 can be brought into clamping engagement with the casing 38 by tightening the hose clamp 111.

At its left end the anchor shell 110 is provided with four through apertures 113 for receiving the rectangular U-shaped anchor 114, which may be made of iron wire, and which registers with the apertures 113 so that its two legs may be slid through the anchor shell 110.

The spacing of the legs 115 is such that their inner surfaces engage the flattened portions 116 on the flex seal body when the parts are disposed as shown in Fig. 1. Thus the anchor 114 is adapted to prevent the casing 38 from rotating because of the engagement of the anchor legs 115 with the fixed member 64.

The flex seal fit 64 has its threaded end 28 of smaller size than the cylindrical portion 65, thereby providing an annular shoulder at 117, which projects beyond the flats 116. Thus the anchor 114 may be used to secure the casing 38 and anchor shell 110 in such a position that the anchor 114 has its legs at the left of the annular shoulder 117, as shown in Fig. 5 and shown in Fig. 3.

Before utilizing this feature, however, it is desirable to re-adjust the anchor sleeve 110 by loosening the hose clamp 111, sliding it toward the right on the casing 38 from the position of Fig. 1 to substantially that of Fig. 3, where the anchor shell 110 may be clamped in place.

This may be done because the ball of the flex seal 64 is smaller than the cylindrical portion 65. Between the cylindrical portion 65 and the ball portion 63 of the flex seal 64 there is the partially circular groove 85, which permits a wider range of movement of the sealing ring 105 on the ball surface 63.

The sealing ring 105 is preferably made of an asbestos compound including graphite and a phenolic binder; and it is self-lubricating.

The operation of the present unit is as follows: When the parts are in the position of Fig. 1, the calender roll 11 may rotate; and any whipping or other non-central action of the trunnion 14 may cause the rotor fitting 23 to move in an orbit; but this is permitted by the universal joint at the surfaces at 25 and 95.

The clearance which is provided between the tube 61 and the holes through which it passes is sufficient to permit whipping action without the tube engaging any of the parts through which it passes. Rotation of the casing 38 is prevented by the anchor 114; but universal movement takes place also at the surfaces 63 and 108; and at both ball surfaces a liquid and gas-tight seal is maintained by means of the spring pressure and the steam pressure.

When it is necessary to service or replace the unit 10, the anchor shell 110 is moved toward the right, as shown in Fig. 2, and clamped by means of the hose clamp 111, the anchor 114 moving off the flats 116 into a position where it is adjacent the groove 85 or about the ball 63. This shortens the assembly so that when the casing is pushed toward the left, as shown in Fig. 3, the anchor 114 may move to the left of the annular surface 28.

In this position the casing and anchor may be rotated ninety degrees from the position of Fig. 4 to that of Fig. 5; and the casing will be held in the position of Fig. 3 against the compression of spring 101.

This exposes a short section of the tube 61 for application of a wrench so that the tube 61 may be screwed out of the threaded bore 80 in the pipe fitting 12; and then the tube 61 may be moved to the right, where it will not interfere with the removal of the unit 10.

The unit 10 may then be pushed again to the left and turned ninety degrees until the anchor 114 registers with the flats 116; and the unit 10 may then be pivoted downward to the dotted line position, shown in Fig. 2, clearing the ball surface 25 and the end of the tube 61.

Then the unit may be permitted to expand until the piston hits the anchor 114, further expansion being prevented by the anchor; and the unit may be moved toward the right, off the ball surface 63, and entirely removed.

Thus it will be observed that were it not for the siphon tube 61, which happens to be threaded into place in this embodiment, the cartridge unit 10 can be installed and removed without the use of any wrenches; and new units can be inserted and substituted for the old ones in a minimum amount of time so that the machine need not be out of service except for a few minutes.

The new unit may be installed by merely reversing the procedure, engaging the ball 63 first, with the left end compressing the casing against it until the piston 51 compresses the spring 101, thus making the unit shorter.

The unit should then be moved to the left until it can be anchored in the position of Fig. 3. Then the siphon tube 61 may again be installed by threading it into the bore 80. The siphon tube should bear an appropriate marking so that it is finally located with its end 87 downward; and thereafter the unit 10 may be permitted to expand into engagement with the ball surface 25 by rotating it ninety degrees until the anchor slides over the flats 116.

The anchor shell 110 should then be adjusted from the position of Fig. 2 to that of Fig. 1 so that it will prevent rotation of the entire unit; and the joint is again ready for use.

The present joint units can be removed and replaced so quickly that the plant need only stop its operations momentarily; and the loss of time due to a defective joint or to wear or replacement is reduced to a minimum. The present joint units are simple in their construction, sturdy, and adapted to be used for a long period of time without necessity for repair or replacement.

They may be manufactured at a low cost so that they can be sold within a price range that makes them available to a larger number of the purchasing public. The amount of machining and other manufacturing operations have been reduced to a minimum; and the number of parts has been reduced to a minimum.

The materials employed are such that wear is reduced to a minimum, corrosion is substantially eliminated; and the joint units and accompanying fittings are kept in a smooth and bright liquid-tight condition by virtue of their own operation.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a liquid and gas-tight rotating tubular joint unit, the combination of a tubular housing having an annular flange at one end projecting inwardly, an annular packing engaging the outer side of said flange, and having a partially spherical annular surface facing outwardly for engaging a complementary surface on a ball fixture, a threaded ferrule threaded on the end of said tubular housing, for securing said packing fixedly on the housing, a piston slidably mounted in said housing, and having an enlarged axial through bore, said piston having an outwardly facing annular shoulder and a counterbore, a packing in said counterbore engaging said annular shoulder, and having a partially spherical annular surface facing outwardly to engage a complementary surface on a ball fitting, a packing carried by said piston and engaging both the piston and the inner wall of said tubular housing to provide a fluid-tight sliding joint, and compression spring means in said housing acting on said latter packing and reacting against said annular flange.

2. In a liquid and gas-tight rotating tubular joint unit, the combination of a tubular housing having an annular flange at one end projecting inwardly, an annular packing engaging the outer side of said flange, and having a partially spherical annular surface facing outwardly for engaging a complementary surface on a ball fixture, a threaded ferrule threaded on the end of said tubular housing, for securing said packing fixedly on the housing, a piston slidably mounted in said housing, and having an enlarged axial through bore, said piston having an outwardly facing annular shoulder and a counterbore, a second annular packing in said counterbore engaging said annular shoulder, and having a partially spherical annular surface facing outwardly to engage a complementary surface on a ball fitting, a packing carried by said piston and engaging both the piston and the inner wall of said tubular housing to provide a fluid-tight sliding joint, and compression spring means in said housing acting on said latter packing and reacting against said annular flange, an auxiliary sleeve slidably mounted on said tubular housing adjacent the sliding packing, a ball fitting for engaging said second annular packing, said ball fitting having an elongated neck and a reduced threaded portion, with shoulders between said neck and threaded portion, said auxiliary sleeve carrying a transverse member which engages a flat on said neck to prevent rotation of said housing, and which may be moved by compressing said spring and turned on said neck to engage said latter shoulder and retain the auxiliary sleeve and housing in a position in which said resilient means is compressed.

3. A quickly replaceable unit assembly for rotating fluid-tight tubular joints, consisting of a tubular metal housing having a through bore with an annular flange forming a packing seat at one end, a piston slidably mounted in said through bore adjacent the other end, and having a packing slidably engaging the walls of said through bore for resisting internal pressure, said piston being formed with a through bore, and a larger counterbore at its outer end, forming a seat and a socket for an annular packing, an annular packing on said seat at said one end, and having only one narrow annular partially spherical groove, forming an engaging surface and facing outwardly to engage a ball fitting, a second annular packing in said socket, and having only one narrow annular, partially spherical groove, forming an engaging surface and facing outwardly for engaging a ball fitting, a pair of ball fittings having through bores, and a ball end on each fitting engaged only by said outwardly facing engaging surfaces on said packings, and spring means in said housing engaging said flange and reacting against said piston packing, to urge the piston packing into engagement with the wall of the through bore in said housing, to urge the annular packings on said flange and in said piston into engagement with the ball fittings, the said unit being removably held on said ball fittings when the ball fittings are mounted in definite spaced relation to each other by spring pressure, and the said unit being quickly removable by pushing the housing toward the ball fitting at the piston end, the piston receding in the housing, and the spring being compressed until the other end of the housing clears its ball fitting.

4. A quickly replaceable unit assembly for rotating fluid-tight tubular joints, consisting of a tubular metal housing having a through bore with an annular flange forming a packing seat at one end, a piston slidably mounted in said through bore adjacent the other end, and having a packing slidably engaging the walls of said through bore for resisting internal pressure, said piston being formed with a through bore, and a larger counterbore at its outer end, forming a seat and a socket for an annular packing, an annular packing on said seat at said one end, and having only one narrow annular partially spherical groove, forming an engaging surface and facing outwardly to engage a ball fitting, a second annular packing in said socket, and having only one narrow annular, partially spherical groove, forming an engaging surface and facing outwardly for engaging a ball fitting, a pair of ball fittings having through bores, and a ball end on each fitting engaged only by said outwardly facing engaging surfaces on said packings, and spring means in said housing engaging said flange and reacting against said piston packing, to urge the piston packing into engagement with the wall of the through bore in said housing, to urge the annular packings on said flange and in said piston into engagement with the ball fittings, the said unit being removably held on said ball fittings when the ball fittings are mounted in definite spaced relation to each other by spring pressure, and the said unit being quickly removable by pushing the housing toward the ball fitting at the piston end, the piston receding in the housing, and the spring being compressed until the other end of the housing clears its ball fitting, the said annular packings each comprising a narrow integral member of hard, rigid carbon graphite composition having an outer cylindrical surface, an inner bore, and plane end surfaces in addition to said partially spherical groove.

5. A rotatable fluid tight tubular joint comprising a pair of oppositely facing threaded fittings, each having a partially spherical surface each entirely facing the other, surrounding a through conduit and a removable joint unit comprising a rigid tubular casing having a fixed packing seat outside one end, a rigid packing member having an inner outwardly facing partially spherical packing surface universally engaging the partially spherical surface on the first fitting, an annular cap securing said packing member on said casing, a cylindrical sliding packing supporting member in said casing and carrying packing engaging the inner wall of said casing, a spring in said casing urging said sliding member outward and a second rigid packing member having an inner partially spherical packing surface engaging the partially spherical surface of the other fitting and carried by said sliding cylindrical member inside said casing and establishing fluid tight communication between said fittings by virtue of the expansion of said unit by said spring, the unit pressure on said packings increasing with fluid pressure inside the unit, to maintain the joint tight under increased fluid pressure, whereby said unit may be axially compressed and laterally removed from between fittings.

6. A rotatable joint according to claim 5, in which said second fitting has a flat peripheral surface on its shank and said casing having a through member slidably engaging said flat surface to prevent relative rotation between said casing and second fitting.

7. A rotatable joint according to claim 5, in which said casing has an enlarged diameter relative to said ball fittings sufficient to permit said casing to pivot on said second fitting with said second fitting inside the casing to recede from and clear the first fitting when the second fitting and sliding supporting member are pressed into said casing compressing said spring.

8. A rotatable joint according to claim 5, in which said second fitting is threaded into a pipe fitting having a condensate tube threaded into said pipe fitting and extending through said unit, said condensate tube being accessible for removal by pressing said unit away from said first fitting.

EPHRAIM H. SHUMAKER.

References Cited in the file of this patent

UNITED STATES PATENTS

| Number | Name | Date |
| --- | --- | --- |
| 289,265 | Hurly | Nov. 27, 1883 |
| 956,290 | Colson | Apr. 26, 1910 |
| 1,603,916 | Hundemer | Oct. 19, 1926 |
| 1,614,667 | Gillick | Jan. 18, 1927 |
| 1,934,717 | Johnson | Nov. 14, 1933 |
| 2,021,241 | Mall | Nov. 19, 1935 |
| 2,164,445 | Bridge | July 4, 1939 |
| 2,347,651 | Washam | May 2, 1944 |
| 2,352,317 | Goff et al. | June 27, 1944 |

FOREIGN PATENTS

| Number | Country | Date |
| --- | --- | --- |
| 579,401 | Great Britain | Aug. 1, 1946 |